United States Patent

Yamaue

[19]

[11] Patent Number: 6,091,683
[45] Date of Patent: Jul. 18, 2000

[54] DATA REPRODUCTION APPARATUS FOR DISK MEDIUM

[75] Inventor: Toshihiko Yamaue, Osaka, Japan

[73] Assignee: Funai Techno-Systems Co., Ltd., Osaka, Japan

[21] Appl. No.: 09/098,621

[22] Filed: Jun. 17, 1998

[30] Foreign Application Priority Data

Jun. 18, 1997 [JP] Japan ................................ 9-005795

[51] Int. Cl.[7] ............................................ G11B 5/09
[52] U.S. Cl. ...................... 369/48; 369/32; 369/124.07
[58] Field of Search .............................. 369/32, 33, 47, 369/48, 53, 54, 58, 59, 60.01, 124.07; 360/27, 25, 40, 49, 53

[56] References Cited

FOREIGN PATENT DOCUMENTS 3012596  4/1995  Japan .
7-121887  5/1995  Japan .
7-334949  12/1995  Japan .

OTHER PUBLICATIONS

008929 Japan technical evaluation for Utility Model (Search Report) and partial translation thereof.
Japanese Utility Model Search Report for Hei 9–005795, Jun. 18, 1997.

*Primary Examiner*—Paul W. Huber
*Attorney, Agent, or Firm*—Lackenbach, Siegel, Marzullo, Aronson & Greenspan

[57] ABSTRACT

A data reproduction apparatus for a disk medium is disclosed. The apparatus comprises a data reading section reading subcode data recorded on the disk medium and corresponding main data recorded therewith, a sub Q code acquisition section separating sub Q codes from the subcode data read by the data reading section so as to acquire a plurality of sub Q codes corresponding to a plurality of serial subcode synchronizing signal, the sub Q code indicating an absolute time of the subcode data in the disk medium, a first condition judgement section generating a signal when each of the absolute time indicated by the sub Q code is identical with the others, a second condition judgement section generating a signal when the absolute time indicated by succeeding sub Q code is later within a predetermined time than that indicated by preceding sub Q code, and a final judgement section judging whether correct reading of the subcode data is performed when the signal from at least one of the first condition judgement section and the second condition judgement section is detected.

4 Claims, 2 Drawing Sheets

DATA REPRODUCTION APPARATUS FOR DISK MEDIUM

BACKGROUND OF THE INVENTION

1. Technical Field of the Invention

The present invention relates to a data reproduction apparatus for a disk medium reproducing digital data from a digital disk, such as CD, CD-ROM, or the like, on which the digital data have been recorded along a spiral track, and more particularly relates to reading of subcode data indicating a position or attributes of a data body.

2. Background of the Invention

Conventionally, on a CD, a CD-ROM disk, or the like, used as a bulk data recording medium, data signals have been recorded by a CLV (constant linear velocity) system. Further, in this disk, a data body and subcode data indicating the position or attributes of the data body have been recorded along a spiral track.

In a CD-ROM disk, generally, one data block (sector) is constituted by 98 data frames. Each data frame has 24 bytes of data and 8 bytes of them are distributed for subcodes (channel P to W). In channel Q of each subcode (sub Q code), the value of the absolute time of the data block is recorded. In the sub Q code in a read-in region (innermost region of the disk), information concerning the arrangement of a program region and a read-out region (outermost region of the disk-) is recorded as search information. This information is called TOC (table of contents), and in this information, the absolute time of the head portion of each track in the program region, the control information of each track, the first and last track numbers of the program region, and the starting absolute time of the program region are recorded. The sub Q codes can be extracted from the subcodes in accordance with a subcode synchronizing signal having 75 Hz of frequency.

The subcode is necessary for grasping the current position of a pickup on a disk at the time of seeking, and for obtaining the number of tracks between the current position and a target position which is the destination of movement of the pickup, and the numerical value thereof must be arcuate. A servo mechanism is relatively stable at the time of ordinary reproducing. However, the timing when the subcode is read in seeking time is just after track jump so that the servo mechanism is unstable, and sometimes there is a fear that an erroneous subcode data may be read. Not only this defect is a fatal hindrance for seeking operation and makes the seeking operation take a long time, but also this defect may cause such an accident that the pickup comes off from the outermost circumference of the data recorded position of a disk.

SUMMARY OF THE INVENTION

The present invention has been achieved to solve the such a problem as described above in the conventional technique and it is an object of the invention to provide a data reproduction apparatus for a disk medium in which it is possible to make an judgment rapidly as to whether a subcode could be read correctly or not in the transient time such as just after track jump.

To achieve the object, there is provided a data reproduction apparatus for a disk medium which comprises a data reading section reading subcode data recorded on the disk medium and corresponding main data recorded therewith, a sub Q code acquisition section separating sub Q codes from the subcode data read by the data reading section so as to acquire a plurality of sub Q codes corresponding to a plurality of serial subcode synchronizing signal, the sub Q code indicating an absolute time of the subcode data in the disk medium, a first condition judgement section generating a signal when each of the absolute time indicated by the sub Q code is identical with the others, a second condition judgement section generating a signal when the absolute time indicated by succeeding sub Q code is later within a predetermined time than that indicated by preceding sub Q code, and a final judgement section judging whether correct reading of the subcode data is performed when the signal from at least one of the first condition judgement section and the second condition judgement section is detected.

According to the present invention, the plurality of sub Q codes may be two sub Q codes, and the predetermined time may be one second.

DETAILED DESCRIPTION OF THE PREFERRED EMBODIMENT

Detailed descriptions will be given below in detail of one embodiment of the present invention.

Figure 1:
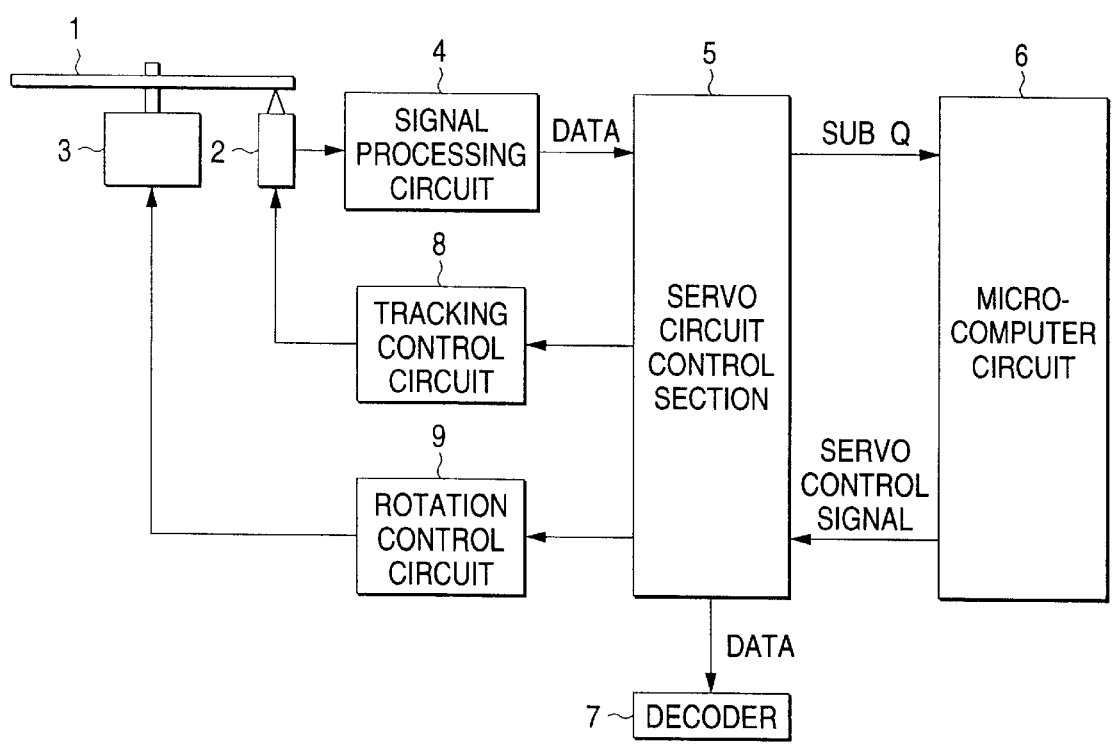
FIG. 1 is a block diagram showing an electric configuration of a data reproduction apparatus for a disk medium according to one embodiment of the present invention.

FIG. 1 is a block diagram showing an electric configuration of in a data reproduction apparatus for a disk medium according to the present invention. In a disk 1, a data body and subcode data indicating a position or attributes of the data body is recorded along a spiral track. A pickup 2 is a section constituted by a light detecting element for tracking, a light detecting element for focusing and data reading, etc. The pickup 2 optically reads the data recorded on the disk 1 while the disk 1 being rotated by a spindle motor 3, and supplies the read data to a signal processing circuit 4. The signal processing circuit 4 is a section for applying predetermined processing onto the data supplied from the pickup 2. A servo circuit control section 5 separates the Q channel of the subcode from the read data so as to supply the Q channel of the subcode to a microcomputer circuit 6, and supplies a data signal to a decoder 7. Based on a signal supplied from the servo circuit control section 5, a tracking control circuit 8 generates a tracking control signal for controlling the tracking of the pickup 2. Further, based on a signal supplied from the servo circuit control section 5, a rotation control circuit 9 generates a rotation control signal for controlling the rotation of the spindle motor 3.

When the digital disk 1 is set in a predetermined position so as to make it possible to read the data, various kinds of information are read from the digital disk 1 which- is rotating at a predetermined reading speed. Of various kinds of information outputted from the servo circuit control section 5, based on time information indicating the data recording time, a necessary control signal can be generated.

In order to judge whether data are correct or not, according to the present invention, data of sub Q code corresponding to two succeeding synchronizing signals are acquired, and so-called double coincidence checking of the subcode data is performed to thereby inspect the continuity between the two sub Q codes. More in detail, since the data of the two sub Q codes are not completely identical with each other (generally, there is a displacement of one frame), it is concluded that the two subcodes are coincident twice with each other when they are coincident in minute and second of the absolute time in the subcode data or when the absolute time of the succeeding subcode data is larger by one second than the preceding subcode data.

In this case, it is concluded that the subcodes have been read correctly.

Figure 2:
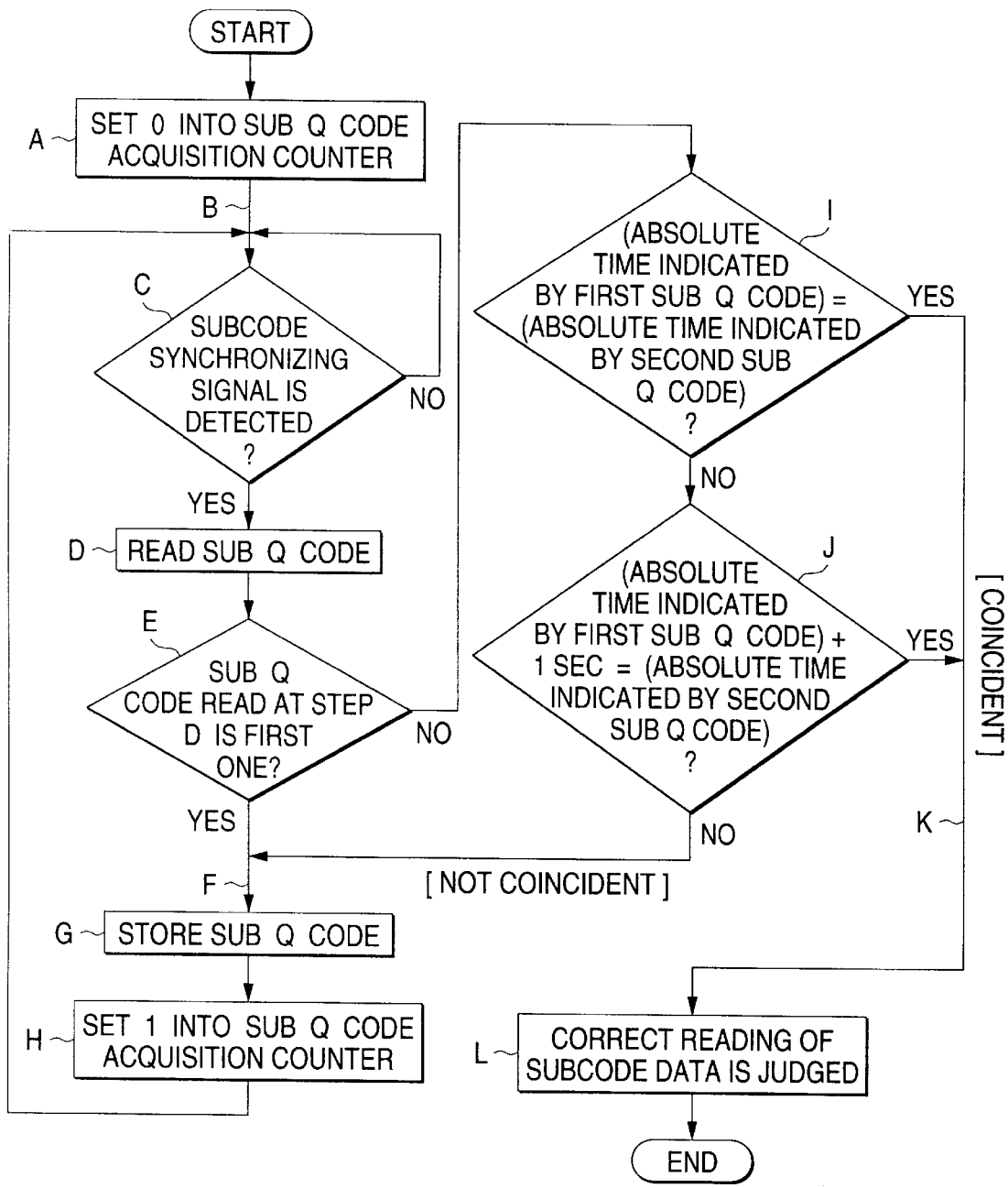
FIG. 2 is a flow chart for explaining an operation of the data reproduction apparatus for the disk medium according to the present invention.

FIG. 2 shows a flow chart for explaining such an operation of the present invention as described above. That is, the operation starts from START and "0" is inputted into a sub Q code acquisition counter at step A. A judgment is made as to whether there is a subcode synchronizing signal or not at step C, and if "NO", the operation goes to step B and then the judgement at step C is repeated. If "YES" on the contrary, the operation goes to the lower steps D and then the subcode is read. Consequently, a check is made at the step E as to whether the content of the counter is "0" (subcode at the first time) or "1" (subcode not at the first time) and if "YES" the operation goes to lower step G. If "NO" on the contrary, the operation goes to step I in which it is judged whether the preceding and succeeding subcodes are coincident with each other with regard to the minute and second of the absolute time therein or not. If "YES", the operation goes to step L and it is concluded that the current subcode is correct data. While if "NO", the operation goes to lower step J in which it is judged whether the absolute time obtained by adding one second to the absolute time of the preceding sub Q code is coincident with the absolute time of succeeding sub Q code or not. If "NO" (not coincident) at the step J, the operation goes to step F. At step G, the signal is stored. At step H, the sub Q code acquisition counter is made to be "1" and acquisition of the first subcode is achieved. Then the operation goes to the step B again from the step H. If "YES" at each of the steps I and J, the operation goes to the step L and it is concluded that the current subcode is correct data.

As had been described heretofore, in the data reproduction apparatus for disk medium according to the present invention, sub Q code corresponding to the two subcode synchronizing signals suceedingly read in transient time just after track jump or the like are taken in, and it is concluded that the subcode data are correctly read when the plurality of (it may be two) serial sub Q code are coincident with each other with respect to minute and second of the absolute time therein or when the succeeding sub Q code is larger by predetermined seconds (it may be one second) than the preceding sub Q code. Accordingly, the subcodes may be read with no error or correctly.

What is claimed is:

1. A data reproduction apparatus for a disk medium comprising:

a data reading section reading subcode data recorded on the disk medium and corresponding main data recorded therewith;

a sub Q code acquisition section separating sub Q codes from the subcode data read by the data reading section so as to acquire sub Q codes corresponding to a plurality of serial subcode synchronizing signal, the sub Q code indicating an absolute time of the subcode data in the disk medium;

a first condition judgement section generating a signal when each of the absolute time indicated by the sub Q code is identical with the others;

a second condition judgement section generating a signal when the absolute time indicated by succeeding sub Q code is later within a predetermined time than that indicated by preceding sub Q code; and a final judgement section judging whether correct reading of the subcode data is performed when the signal from at least one of the first condition judgement section and the second condition judgement section is detected.

2. The data reproduction apparatus for the disk medium as set forth in claim 1, wherein the plurality of sub Q codes are two sub Q codes, and the predetermined time is one second.

3. A method for judging a correct reading of subcode data recorded on a disk medium and corresponding main data recorded therewith comprising the steps of:

reading the subcode data from the disk medium;

separating sub Q codes from the subcode data so as to acquire sub Q codes corresponding to a plurality of serial subcode synchronizing signal, the sub Q code indicating an absolute time of the subcode data in the disk medium;

checking whether each of the absolute time indicated by the sub Q code is identical with the others;

checking whether the absolute time indicated by succeeding sub Q code is later within a predetermined time than that indicated by preceding sub Q code; and judging whether the correct reading of the subcode data is performed when at least one of the above conditions is satisfied.

4. The method for judging a correct reading of subcode data as set forth in claim 3, wherein the plurality of sub Q codes are two sub Q codes, and the predetermined time is one second.

* * * * *